(12) United States Patent
Gooding

(10) Patent No.: US 7,131,684 B1
(45) Date of Patent: Nov. 7, 2006

(54) VEHICLE BED COVER

(75) Inventor: Richard A. Gooding, Albuquerque, NM (US)

(73) Assignee: Goodcast, LLC, Albuquerque, NM (US)

( * ) Notice: Subject to any disclaimer, the term of this patent is extended or adjusted under 35 U.S.C. 154(b) by 0 days.

(21) Appl. No.: 11/183,338

(22) Filed: Jul. 15, 2005

Related U.S. Application Data

(60) Provisional application No. 60/588,283, filed on Jul. 15, 2004, provisional application No. 60/614,875, filed on Sep. 29, 2004.

(51) Int. Cl.
*B60P 7/02* (2006.01)

(52) U.S. Cl. .......................... 296/100.09; 296/100.07; 296/100.1

(58) Field of Classification Search ........... 296/100.09, 296/100.06, 100.07, 100.08, 100.1, 100.02
See application file for complete search history.

(56) References Cited

U.S. PATENT DOCUMENTS

| | | | |
|---|---|---|---|
| 4,313,636 A | 2/1982 | Deeds | |
| 4,406,493 A | 9/1983 | Albrecht et al. | |
| 4,832,394 A | 5/1989 | Macomber | |
| 5,087,093 A | 2/1992 | Repetti | |
| 5,183,309 A | 2/1993 | Jordan | |
| 5,427,428 A | 6/1995 | Ericson et al. | |
| 5,857,729 A * | 1/1999 | Bogard | 296/100.09 |
| 6,076,881 A | 6/2000 | Tucker | |
| 6,082,806 A | 7/2000 | Bogard | |
| 6,106,051 A | 8/2000 | Miskowic | |
| 6,170,900 B1 | 1/2001 | Kooiker | |
| 6,176,541 B1 | 1/2001 | Hoff | |
| 6,217,103 B1 | 4/2001 | Schultz et al. | |
| 6,227,602 B1 * | 5/2001 | Bogard | 296/100.06 |
| 6,302,468 B1 | 10/2001 | Steadman | |
| 6,325,439 B1 | 12/2001 | Crossman | |
| 6,352,296 B1 | 3/2002 | Kooiker | |
| 6,439,639 B1 | 8/2002 | Branting | |
| 6,520,559 B1 | 2/2003 | Steffens et al. | |
| 6,527,326 B1 | 3/2003 | Henderson | |
| 6,634,691 B1 | 10/2003 | Henderson | |
| 2001/0035664 A1 | 11/2001 | Steffens et al. | |
| 2003/0057725 A1 | 3/2003 | Hernandez et al. | |
| 2003/0184115 A1 | 10/2003 | Armstrong et al. | |

OTHER PUBLICATIONS

"A customized pickup top that's also practical", http://www.tafcoequip.com/images/stop/jpg, 1-2.
"Gaylord's Truck Bed Lids", http://www.gaylordslids.com/butterfly.php, 1.
"GEMTOP Truck Caps & Lids—Commercial Products", http://www.tafcoequip.com/top.htm, 1-3.
"Scott Top", http://www.tafcoequip.com/top.htm, 1-3.
"Scott-Top", *Tafco—A 35 year manufacturer of quality truck equipment*, Blue Earth, NM.

* cited by examiner

*Primary Examiner*—Joseph D. Pape
(74) *Attorney, Agent, or Firm*—Philip D. Askenazy; Peacock Myers, P.C.

(57) ABSTRACT

A multi-panel elevated vehicle bed cover which provides access to the entire vehicle bed, provides additional storage space in the vehicle bed, and is customizable for different lengths, widths, and vehicles. For ease of installation and removal, the panels may be removed or installed separately from the support legs which are attached to the vehicle.

20 Claims, 19 Drawing Sheets

VEHICLE BED COVER

CROSS-REFERENCE TO RELATED APPLICATIONS

This application claims priority to U.S. Provisional Patent Application Ser. No. 60/588,283, entitled "Truck Bed Cover", filed on Jul. 15, 2004, and also claims priority to U.S. Provisional Patent Application Ser. No. 60/614,875, entitled "Raised Truck Bed Cover", filed on Sep. 29, 2004, and the specifications and claims thereof are incorporated herein by reference.

BACKGROUND OF THE INVENTION

1. Field of the Invention (Technical Field)

The present invention relates to a cover for vehicle beds. The cover is preferably elevated or raised, opens lengthwise, is easily removable and installable even by one person, and is adjustable for different lengths, widths, and types of vehicles.

2. Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

Traditional truck bed covers are difficult to remove, and difficult to store once removed. Current designs also allow limited access to the truck bed contents when the truck cover is attached, particularly those utilizing a hinge or fastener attached near the cab, thus severely limiting the usable and accessible space under the cover. Items near the cab are difficult to reach using these covers. These types of covers are also very expensive due to the design and material type used for fabrication. The following are examples of such truck bed covers.

U.S. Pat. No. 5,183,309 to Jordan, entitled "Rigid Low Profile Pickup Tonneau", issued Feb. 2, 1993, discloses a cover with three rectangular panels, and a longitudinal hinge in the middle of the cover. The third panel extends outside of the truck bed when the tailgate is open.

U.S. Pat. No. 4,832,394 to Macomber, entitled "Truck Cargo Bed Cover", issued May 23, 1989, describes a longitudinally hinged truck bed cover with removable panels. This cover also has removable hinges and separate hinges.

U.S. Pat. No. 6,634,691 to Henderson, entitled "Compartmentalized Storage Container", issued Oct. 21, 2003, discloses a cover which includes a longitudinally, or horizontally hinged cover with a removable storage assembly beneath it. This cover also uses an L-shaped flange, and is designed to hold the removable storage assembly.

The TAFCO Scott-Top is a flat pickup bed cover that is made of galvannealed steel. It has two longitudinal hinges with a flat section in the middle.

The following covers consist of two panels and piano hinges: U.S. Pat. No. 6,076,881 to Tucker, entitled "Flip Hatch Tonneau Cover", issued Jun. 20, 2000; U.S. Pat. No. 6,082,806 to Bogard, entitled "Pick-up Truck Tonneau Cover", issued Jul. 4, 2000; U.S. Pat. No. 6,217,103 to Shultz et al., entitled "Hinged Tonneau Truck Bed Cover With Bed Divider", issued Apr. 17, 2001; and U.S. Pat. No. 6,227,602 to Bogard, entitled "Pick-up Truck Lightweight Cargo Cover", issued May 8, 2001 that also includes lightweight panels.

Prior art references with three hinged panels, primarily horizontally hinged and not raised or elevated are: U.S. Pat. No. 6,439,639 to Branting, entitled "Trailer Hitch Enclosure Device", issued Aug. 27, 2002; U.S. Pat. No. 6,106,051 to Miskowic, entitled "Truck Bed Cover", issued Aug. 22, 2000; U.S. Pat. No. 6,520,559 to Steffens et al., entitled "Folding Cargo Bay Cover For Pickup Truck", issued Feb. 18, 2003; U.S. Pat. No. 6,527,326 to Henderson, entitled "Tonneau Cover and Loading Ramp Assembly", issued Mar. 4, 2003; U.S. Pat. No. 6,352,296 to Kooiker, entitled "Folding Cover For Pickup Truck Bed", issued Mar. 5, 2002; U.S. Pat. No. 6,325,439 to Crossman, entitled "Hanging Storage Unit For A Truck Cargo Bay", issued Dec. 4, 2001; U.S. Pat. No. 6,302,468 to Steadman, entitled "Cover Apparatus", issued Oct. 16, 2001; U.S. Pat. No. 6,176,541 to Hoff, entitled "Truck Bed Cover", issued Jan. 23, 2001; U.S. Pat. No. 6,170,900 to Kooiker, entitled "Foldable Cover With Integral Hinge for Pickup Truck Bed", issued Jan. 9, 2001; U.S. Pat. No. 5,427,428 to Ericson et al., entitled "Foldling Cover For The Bed Of A Pickup Truck", issued Jun. 27, 1995; U.S. Pat. No. 5,087,093 to Repetti, entitled "Hinged Cover For Pick-Up Trucks", issued Feb. 11, 1992; U.S. Pat. No. 4,313,636 to Deeds, entitled "Folding Cover For Truck Bed", issued Feb. 2, 1982; and U.S. Pat. No. 4,406,493 to Albrecht et al., entitled "Panel Latching and Locking Apparatus For Modular Pickup Truck Bed Cover Systems", issued Sep. 27, 1983. These references also include the following U.S. Patent Applications: U.S. 2001/0035664 to Steffens et al., entitled "Folding Cargo Bay Cover For Pickup Truck", filed Jun. 27, 2001 and published on Nov. 1, 2001; U.S. 2003/0184115 to Armstrong et al., entitled "Multi-panel Tonneau Cover", filed Aug. 17, 2001 and published on Oct. 2, 2003; and U.S. 2003/0057725 to Hernandez et al., entitled "Vehicle Structure", filed Oct. 26, 2001 and published on Mar. 27, 2003.

There is a need for a vehicle bed cover that is elevated or raised to provide more storage space, provides easy access to the entire bed area, is lightweight, and is easily installed and removed.

BRIEF SUMMARY OF THE INVENTION

The present invention is a vehicle bed cover comprising at least two support legs removably mounted on a vehicle, each support leg comprising non-horizontal top and bottom surfaces and spanning a vehicle bed; and at least two panels connected by one or more hinges, the panels removably supported by and conformable to the top surfaces of the support legs, the panels and support legs forming an elevated cover when the panels are closed on the support legs. The support legs are preferably arched and the panels are preferably curved. The longitudinal center line of the cover is preferably elevated by a greater amount than a vertical thickness of the support legs. The panels preferably comprise a rigid material, preferably polyethylene or fiberglass, and each preferably weighs less than about 45 pounds. The cover preferably further comprises one or more supports, preferably extendable in length, rotatably attached between the panels and the support legs for supporting the panels in at least a partially open position. Alternatively the cover comprises support rods rotatably attached to the vehicle.

The hinges preferably permit separation of the panels, and optionally permit each of the panels to open completely so as to rest on the other of the panels. At least one of the panels preferably comprises a channel for preventing water, debris, or dirt from reaching the vehicle bed. The panels are preferably able to be cut to a desired length and preferably comprise trimmable edges, which are preferably enclosed by a protective strip. The panels optionally comprise indentations. Each of the panels preferably comprises at least one handle which preferably locks the panel to the vehicle.

The invention is also a vehicle bed cover comprising two or more curved panels, each panel comprising a horizontal side edge and two end panel sections, each comprising a straight bottom edge and a curved top edge, and one or more hinges connecting the panels; wherein when the panels are in a lowered position over a vehicle bed, the straight bottom edges of the end panel sections and the horizontal side edges of the panels rest on a vehicle, the panels thereby forming an elevated cover.

A primary object of the present invention is to provide a lightweight, multiple panel vehicle bed cover which is easily installed and removed.

Another object of the present invention is to provide a cover comprising trimmable tapered edges to easily accommodate different vehicle widths.

Yet another object of the present invention is to provide a cover which is customizable to fit many sizes of vehicle beds, reducing dealer inventory and manufacturing costs.

A further object of the present invention is to provide a vehicle bed cover which is highly competitive in cost to other covers.

A primary advantage of the cover of present invention is that it enables easy access to the vehicle bed.

Another advantage of the cover of the present invention is that it is preferably elevated, providing additional storage area and accommodating taller items, including but not limited to large tool chests and water jugs, in the vehicle bed.

A further advantage of the cover of the present invention is that it preferably comprises a system for easy attachment of the cover to different vehicle beds.

Yet another advantage of the present invention is that one person can easily lift, remove, attach and carry the cover.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. As shown therein.

DETAILED DESCRIPTION OF THE INVENTION

Figure 1:
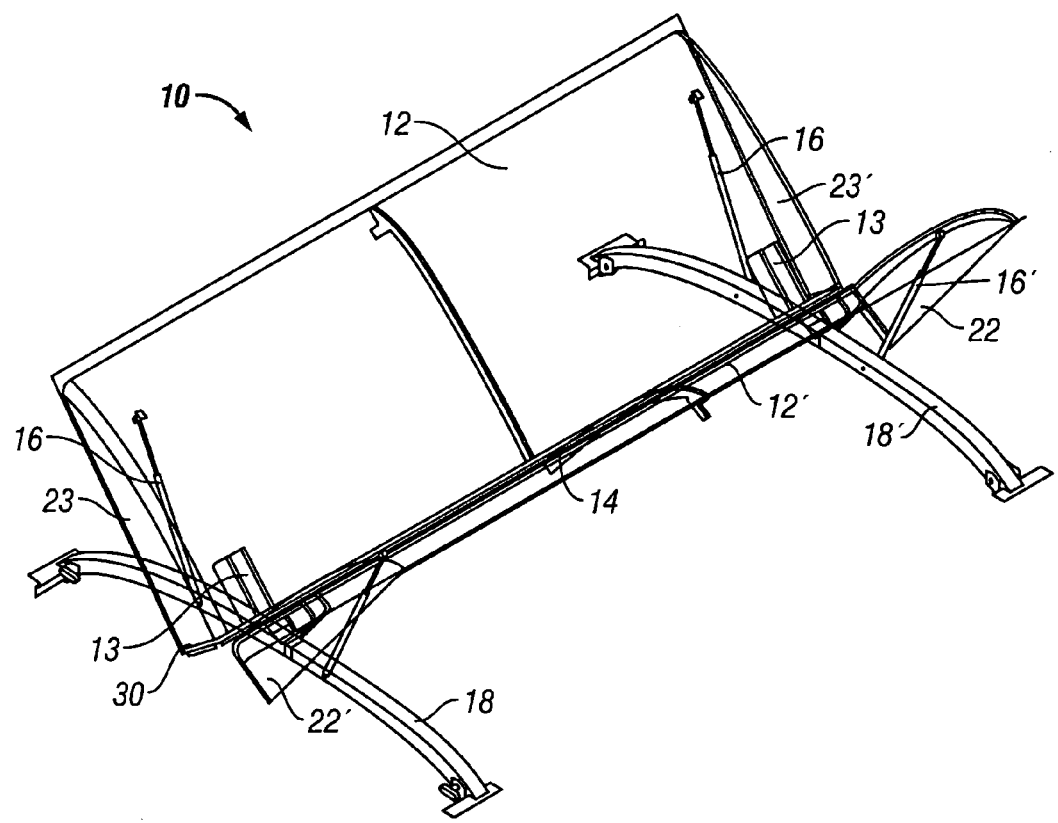
FIG. 1 shows a perspective see-through view of the vehicle bed cover assembly of the present invention.

The present invention preferably comprises a low profile, multi-panel, elevated, hinged cover for a vehicle bed. The cover is preferably lightweight and easily removable and installable.

As used throughout the specification and claims, the term "vehicle" means a pickup or other truck, trailer, boat, or any other vehicle having a vehicle bed. As used throughout the specification and claims, the term "vehicle bed" means any open area of a vehicle which may benefit from having a cover, including but not limited to a pickup truck bed, trailer bed, roof opening, and the like. As used throughout the specification and claims, the term "rail" or "rails" means one or more walls, lips, or other structures partially or completely surrounding a vehicle bed.

The vehicle bed cover of the present invention preferably comprises two rigid, lightweight panels. The panels preferably comprise polyethylene, fiberglass, or any other lightweight material and are preferably thermoformed. Each panel preferably weighs between approximately 25 and approximately 45 pounds. The panels can preferably be cut to any length, preferably at the end but optionally at any point. The panels are preferably trimmable to adjust to various vehicle bed widths. This permits a dealer to stock only a few sizes of panels and to customize a cover for any particular vehicle. The panels may also be cut by the user to fit a particular vehicle.

The panels are preferably hinged together and rest on support legs which are attached to the vehicle. Thus the panels may be removed from the vehicle without simultaneously having to remove the support legs, making removal and installation easy enough for one user to accomplish. In addition, the hinges are optionally designed so that the hinges may be disassembled by the user, enabling one panel at a time to be removed or installed. However, any type of hinge may be used, including but not limited to piano hinges, locking hinges, butt hinges, knuckle hinges, flush hinges, ball bearing hinges, double acting hinges, gravity pilot hinges, offset blind hinges, spring loaded hinges, parliament hinges, and strap hinges.

Although the cover may be flat (i.e. horizontal) when closed, the panels are preferably curved to form an elevated cover when closed. This eliminates standing water which would occur on a flat cover, thus protecting the vehicle bed from rain and other inclement weather. Further, the volume of secure storage area is increased, and taller items are able to be accommodated in the vehicle bed. As used throughout the specification and claims, the term "elevated" means that a lateral cross section, or end view, of the applicable object presents a shape for which both the upper and lower surfaces of the object are higher in the middle than at the sides. For an elevated cover, panels and support legs may be curved to form a cover with an arch-type cross section, or they may be straight and form a triangular cross section. Any incline or slope may be employed. Similarly, any curvature may be used, including but not limited to convex or concave curvatures. Convex or concave indentations or bumps may be used. Therefore, along the longitudinal midline of the vehicle bed the height above the vehicle bed of the elevated cover of the present invention is greater than it is at the sides of the vehicle bed.

FIG. 1 shows a perspective see-through view of vehicle bed cover assembly 10 of the present invention comprising multiple panels in an open position. The cover portion preferably comprises two preferably raised panels 12, 12' which are preferably lightweight and preferably attached to each other with one or more hinges 14. Hinges 14 are preferably easily able to be disassembled, allowing the panels to be separated for simple removal or installation. Panel section 12 is supported in a fully or partially open position preferably by one or more supports 16 which are preferably rotatably attached to the inside of panel 12 and support legs 18, 18'. Preferably two supports per panel are used, although any number may be employed. The supports preferably comprise extruded aluminum or stainless steel and are preferably extendable. The supports are preferably hydraulic, gas charged, spring loaded, or otherwise damped, and provide sufficient force when extended to support the panels in the desired position. When the panels are closed, the supports preferably remain attached to inside of panels 12, 12'. Supports 16, 16' alternatively detach from the panels and rotate out of the way to allow the panels to be closed.

Figure 2:
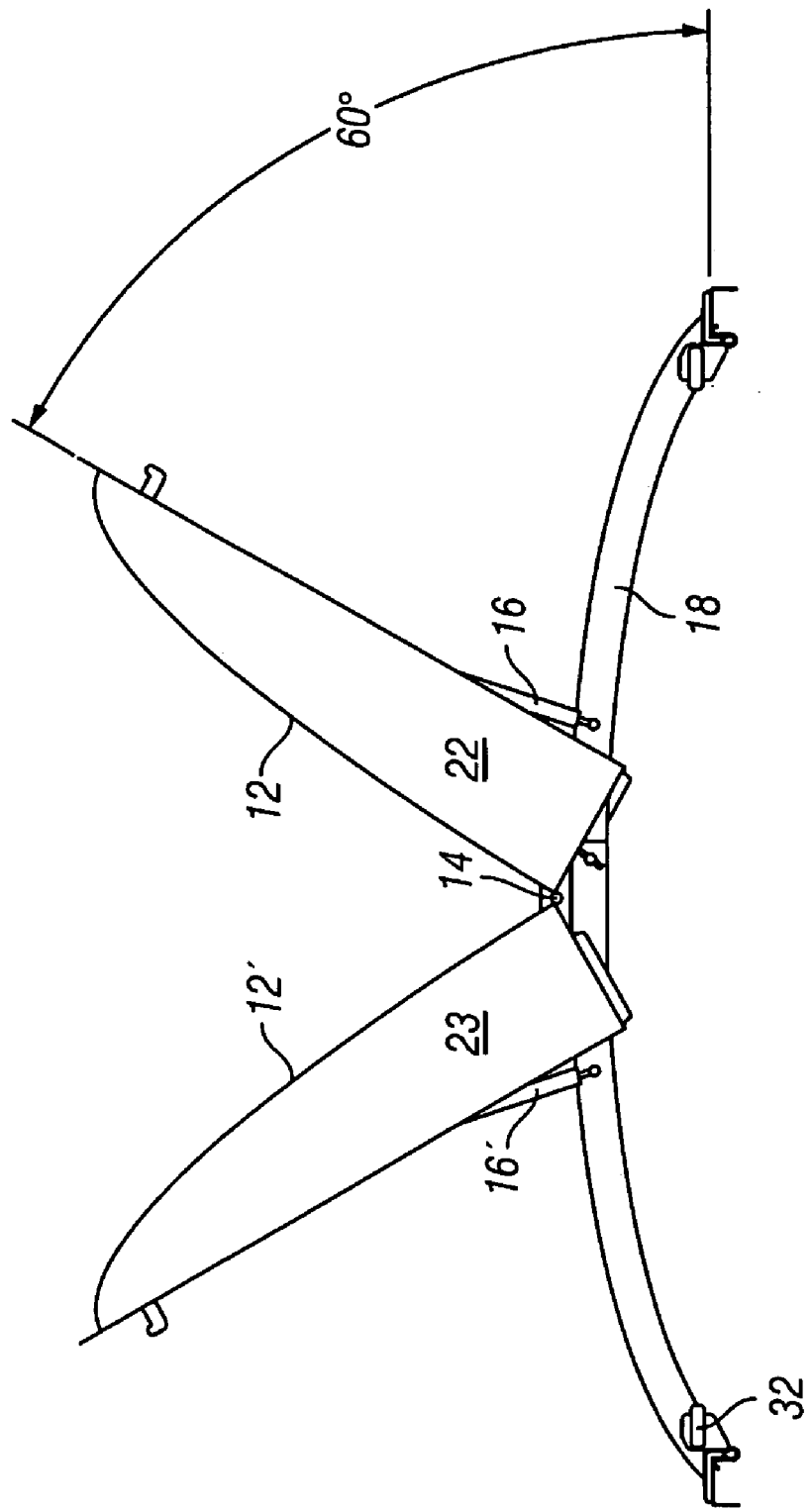
FIG. 2 is an end view showing the vehicle bed cover assembly panels open to a preferred angle.

The panels preferably rest on support legs 18, 18' and may be lifted off by one person. A preferred embodiment of the vehicle bed cover comprises optional end panel sections 22, 22' and 23, 23' that are preferably attached to, or are formed as part of, panels 12', 12 respectively as shown. At least one end panel section preferably also comprises finishing trim 30. The end panel sections serve to prevent access to the vehicle bed when the cover is closed. FIG. 2 is an end view of the vehicle bed cover assembly of FIG. 1 showing panels 12 and 12' open to a preferred angle of approximately 600.

Figure 3:
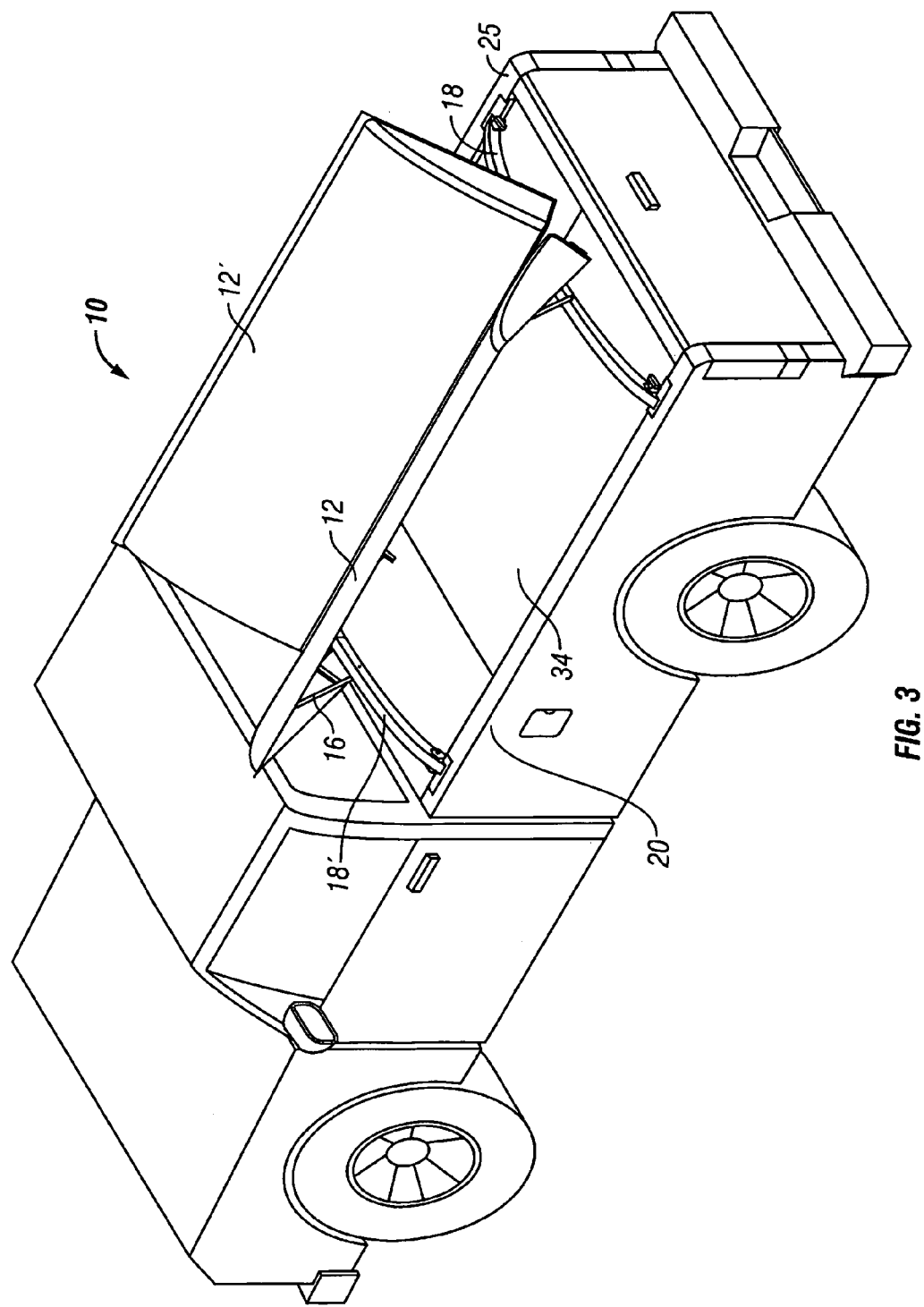
FIG. 3 shows a perspective view of the open vehicle bed cover assembly installed on a vehicle.

FIG. 3 shows a perspective view of vehicle bed cover assembly 10 installed on vehicle rails 20 of a vehicle. For vehicles with no vehicle rails, vehicle bed cover assembly 10 may be installed directly on the vehicle bed. Vehicle rails 20 optionally comprise protective cover 25 which typically comprise vinyl, plastic, or the like. Panels 12, 12' open upward and inward as shown. Hinges 14 are preferably aligned longitudinally along the centerline of the vehicle bed 34.

Figure 4:
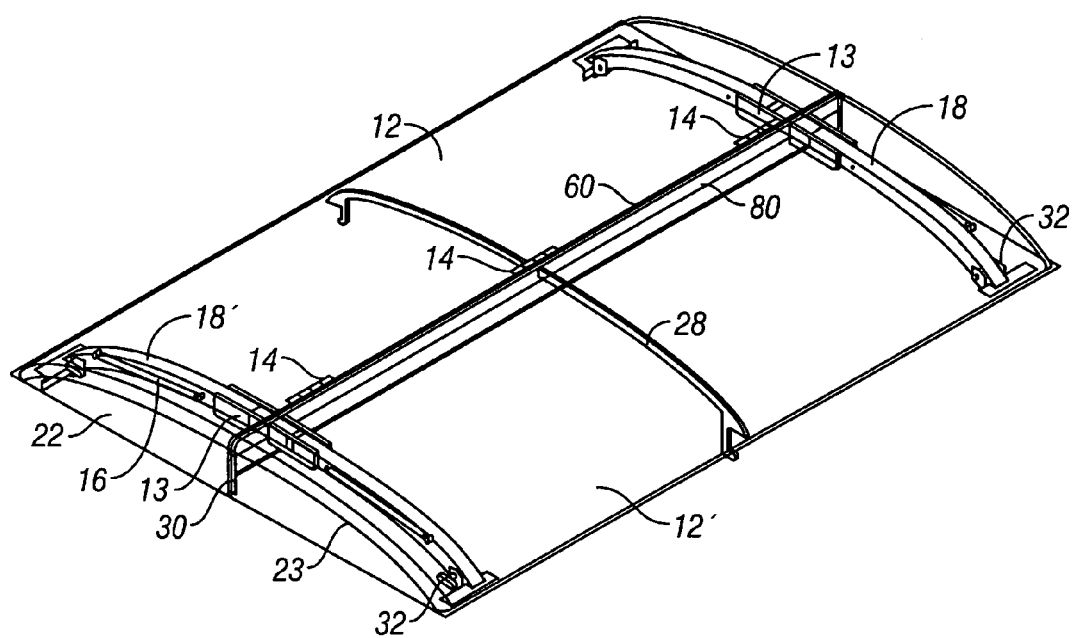
FIG. 4 shows a perspective see-through view of the vehicle bed cover assembly with the panels closed.

FIG. 4 shows a top perspective see-through view of vehicle bed cover assembly 10 with the panels closed. This view highlights seam 60 between panels 12, 12'. Hinges 14 are preferably able to be disassembled so both panels 12, 12' can be removed from each other and from support legs 18, 18'. Although FIG. 4 shows three spaced hinges, any number of hinges may be used, including but not limited to one continuous hinge, for example a piano hinge. Each panel preferably comprises structural rib 28, detailed in FIG. 11, which may be attached to the panel or formed therefrom.

Figure 5:
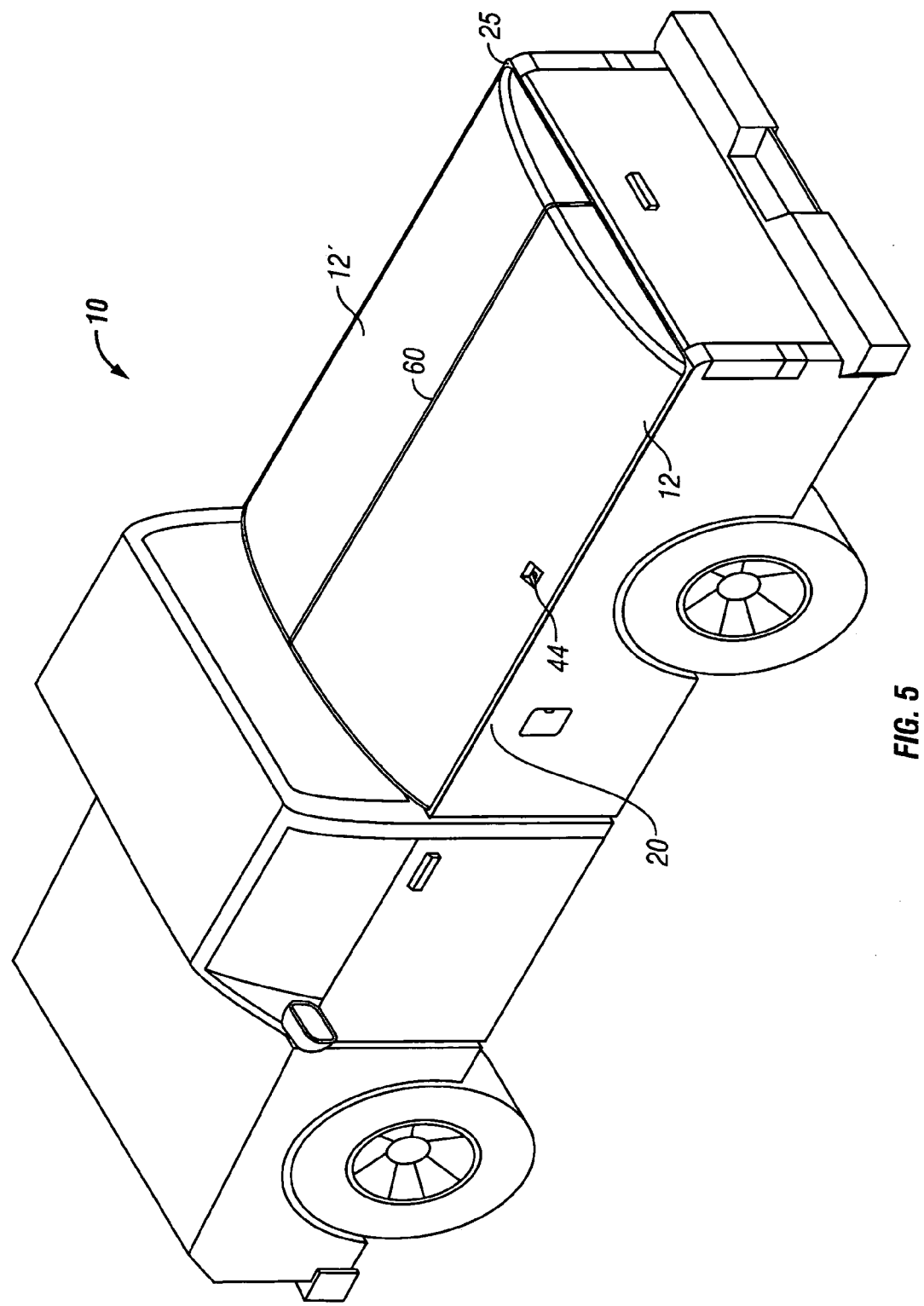
FIG. 5 shows a perspective view of the closed vehicle bed cover assembly installed on a vehicle.

FIG. 5 shows a top perspective view of closed vehicle bed cover assembly 10 installed on vehicle rails 20. When closed, panels 12, 12' preferably form a cover which is elevated above vehicle rails 20 as shown. The amount of elevation of the cover assembly at seam 60, preferably located at the center line of the vehicle bed, is preferably greater than the vertical thickness of the panels and the support legs. Each panel preferably comprises at least one handle 44, detailed in FIG. 10. Note that the panels may optionally rest directly on vehicle rails 20, or even directly on the vehicle bed, without the use of support legs 18, 18'. Unlike the preferred embodiment, in this optional embodiment only one panel may be opened at a time, since the other panel would require end panel sections to support it. Further, if the vehicle rails comprise, for example, the rear hatch of a pickup truck, the hatch must be closed when opening one of the cover panels.

Figure 6:
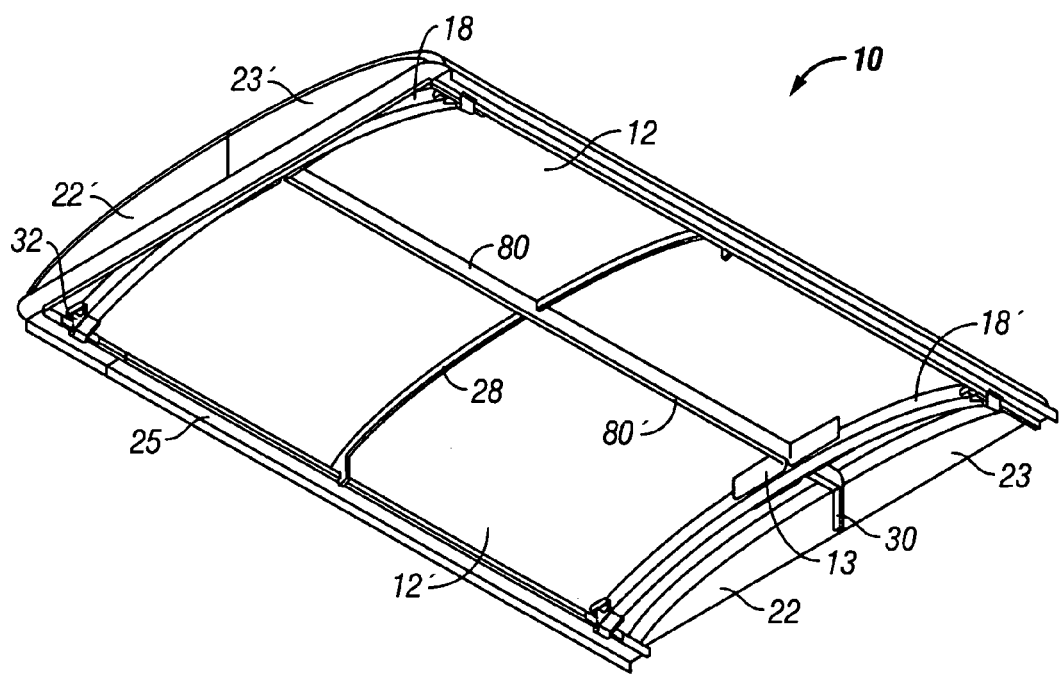
FIG. 6 illustrates an underside view of the vehicle bed cover assembly with panels closed.

FIG. 6 illustrates an underside view of vehicle bed cover assembly 10 with the panels closed. Support legs 18, 18' are preferably connected to vehicle rail 20 by pin and hook clamp apparatus 32, detailed in FIGS. 8 and 9. Preferably each end of support legs 18, 18' comprises one pin and hook clamp apparatus 32. Panels 12, 12' preferably comprise flanges 80, 80' which create seam 60 between them when the panels are closed. Flanges 80, 80' may be attached to the panels or formed therefrom. The curvature of support legs 18, 18' preferably closely approximates the curvature of panels 12, 12'. Panels 12, 12' preferably rest on support legs 18, 18' via gravity and are aligned thereto by panel anchoring channels 13.

Figure 7:
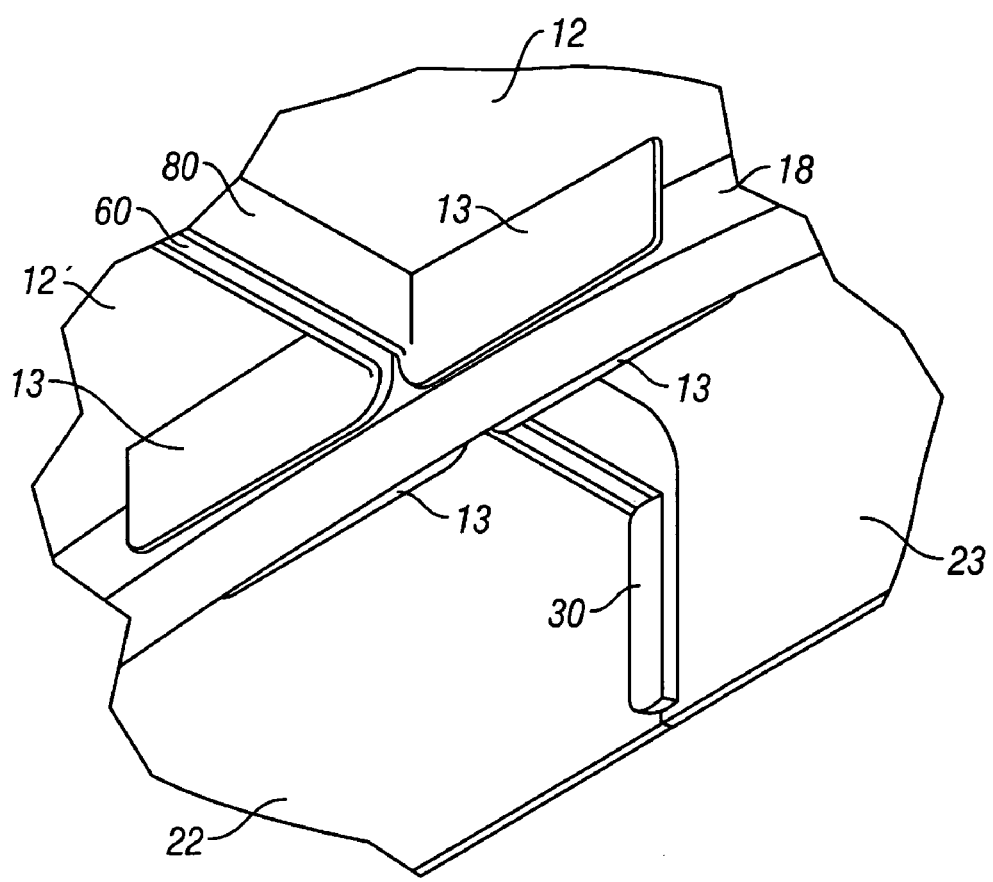
FIG. 7 shows a detail of the panel anchoring channel that is used to fasten the panels to the support legs.

FIG. 7 shows a detail of panel anchoring channels 13 which are attached to or form part of panels 12, 12'. Panel anchoring channels 13 are configured to receive support legs 18, 18' when panels are lowered, thereby aligning the panels with support legs 18, 18' and preventing longitudinal movement of the panels when closed. Panel anchoring channel 13 comprises a simple, easy mechanism to attach vehicle bed cover assembly 10 to support leg 18. Finishing trim 30, preferably attached to or formed as part of either or both end panel sections 22, 23, serves to close the gap or seam between the end panel sections when the panels are closed.

Figure 8:
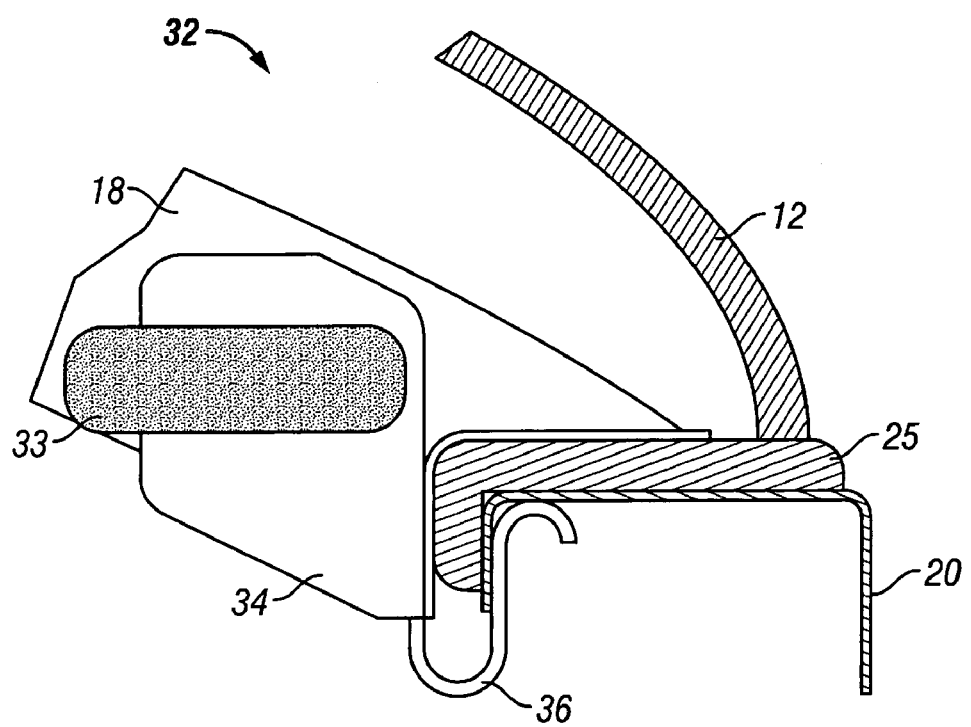
FIG. 8 shows an end view detail of the mechanism used to fasten the support legs to the vehicle.
Figure 9:
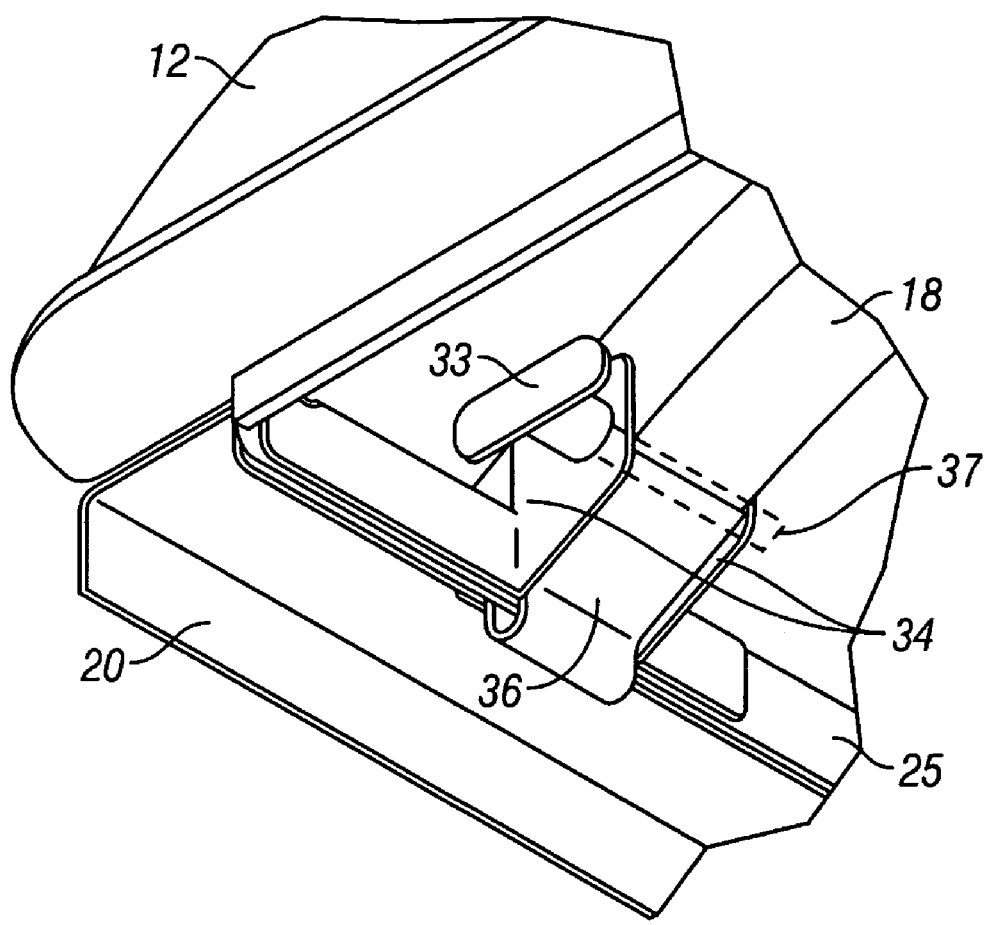
FIG. 9 shows an underside detail of the mechanism used to fasten the support legs to the vehicle.

FIG. 8 shows an end view detail, and FIG. 9 an underside perspective detail, of pin and hook clamp apparatus 32 used to fasten support legs 18, 18' to vehicle rails 20. To install, support leg 18 is placed on vehicle rail 20, which is shown in this figure as comprising protective cover 25. Bracket 34 preferably comprises two vertical plates which fit around support leg 18 and also comprises clip 36 which is shaped to receive the lip of vehicle rail 20 as shown. Bracket 34 is slid up from below so that clip 36 engages with the lip of vehicle bed 20 and bracket 34 is seated against support leg 18. In this position, openings in both vertical plates align with an opening in support leg 18. Latch pin 37, which comprises handle 33, is slid into the openings. Latch pin 37 preferably comprises retractable extensions in its tip to secure pin in the openings. The retractable extensions may be retracted by pushing a button on handle 33. Alternatively a cotter pin or other means known in the art may be used to hold latch pin 37 in place. This simple attachment mechanism allows vehicle bed cover assembly 10 to be easily installed on and removed from the vehicle. Any latching mechanism, including but not limited to a toolbox-type latch, may alternatively be used.

Figure 10:
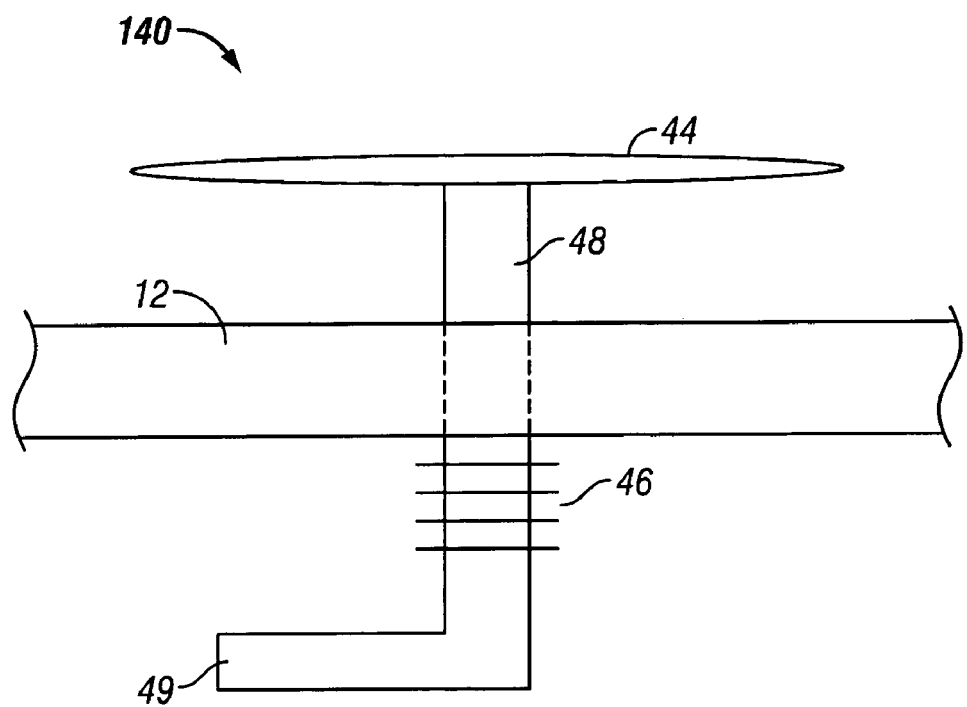
FIG. 10 shows the handle mechanism used to secure the panels to the vehicle.

FIG. 10 shows a cross-section of a preferred embodiment of panel handle mechanism 140 for aiding in lifting a panel and latching it to the vehicle rail. Handle 44 is preferably pushed, compressing spring 46 and lowering pin 49 below the lip of the vehicle rail (not shown). Handle 44 and shaft 48 are preferably then rotated to position pin 49 under the vehicle rail. Handle 44 is then released and spring 46 provides tension forcing pin 49 against the vehicle rail, thereby latching panel 12 to the vehicle. Handle 44 optionally comprises a lock in order to secure the contents of the vehicle bed. The handle may alternatively comprise a push button which retracts bars similar to pin 49 into shaft 48, or other type of locking handle as is known in the art. Each panel preferably comprises one handle mechanism 140 but may optionally comprise multiple handle mechanisms 140. Handle 44 may optionally also be used to help remove and carry the panels.

Figure 11:
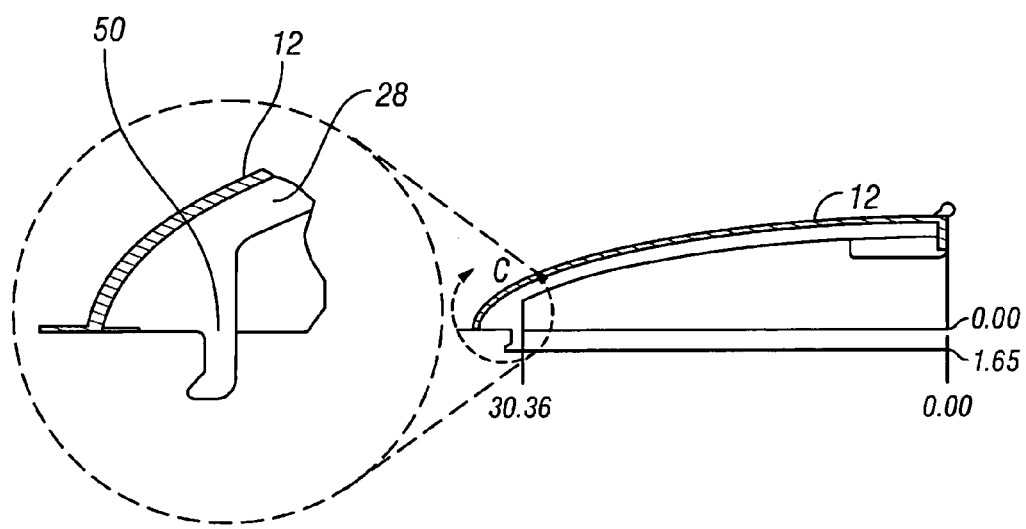
FIG. 11 shows an optional embodiment of a structural rib and example dimensions.

FIG. 11 shows structural rib 28 attached to curved panel 12. Structural rib 28 optionally comprises hook 50 for hooking onto the underside of vehicle rail 20. However, the preferred embodiment of structural rib 28 does not comprise hook 50; the rib's end is preferably flush with the edge of the panel. The dimensions shown in the figure are optional; the elements described herein may comprise any dimensions.

Figure 12:
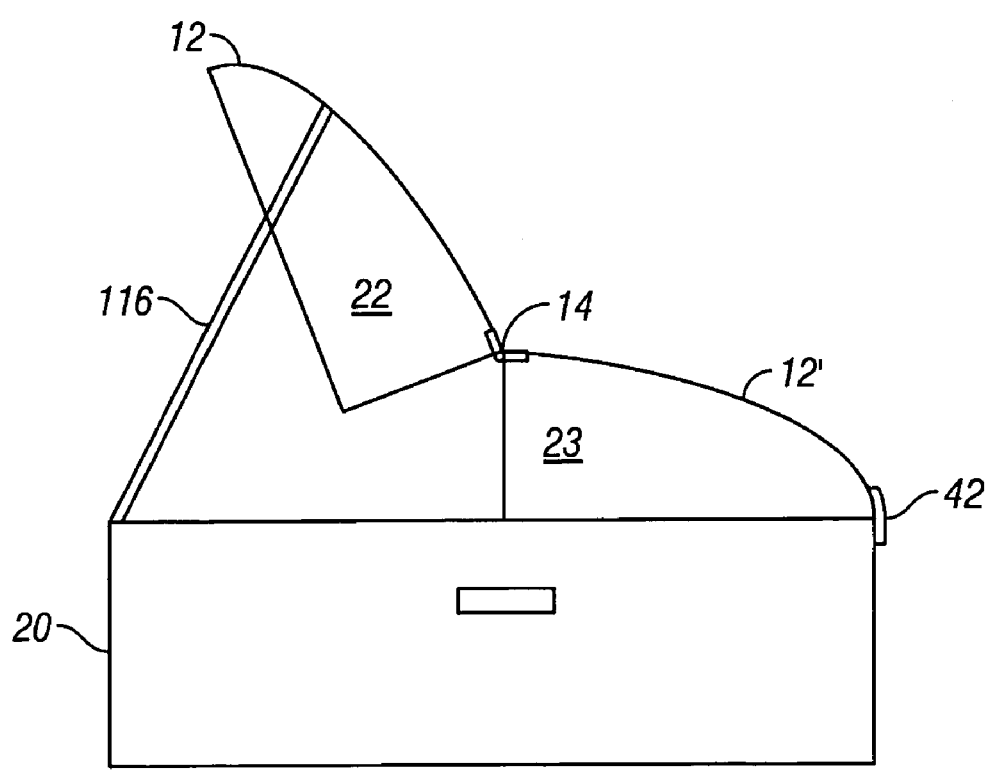
FIG. 12 shows an alternate embodiment of the vehicle bed cover assembly where the panels are supported by a support attached to the vehicle.
Figure 13:
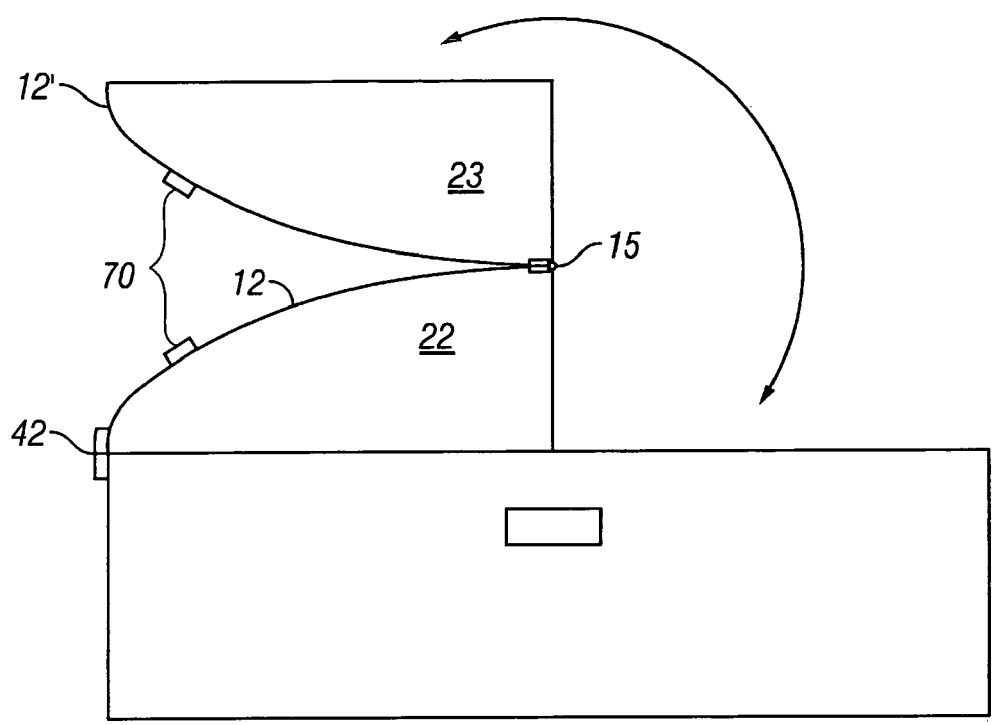
FIG. 13 shows the embodiment of FIG. 12 with one panel and end panel completely open and resting on the other panel and end panel for easy access.

FIG. 12 shows an end view of an alternate embodiment of the present invention. Panel 12 is supported by support 116 which is attached to vehicle rail 20. Support 116 may be extendable or is optionally solid and rotatable about its connection point to vehicle rail 20 for storage in vehicle bed 34. Support 116 may optionally be stored on vehicle rail 20, similar to the support rod for an automobile hood. Cover panels 12, 12' preferably attach to vehicle rail 20 via latches 42 in order to secure the contents of the vehicle bed. FIG. 13 shows the embodiment of FIG. 12 with panel 12' completely open and resting on panel 12 for complete access to one side of the vehicle bed, including easy access to the center of the vehicle bed. Panels 12, 12' preferably comprise handles 70 to aid in lifting the panel. Panels 12, 12' preferably comprise one or more hinges 15 which allow panels to fold over completely on each side.

Figure 14:
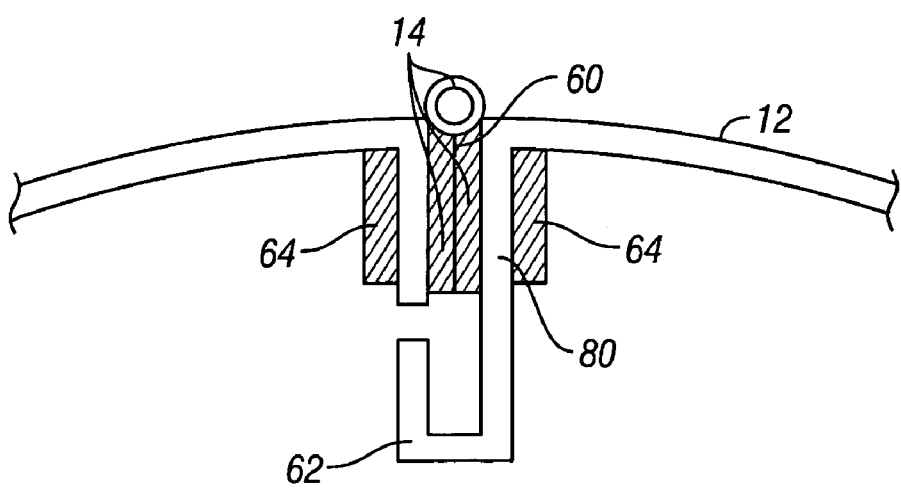
FIG. 14 shows an end view of a preferred embodiment of the J channel.
Figure 15:
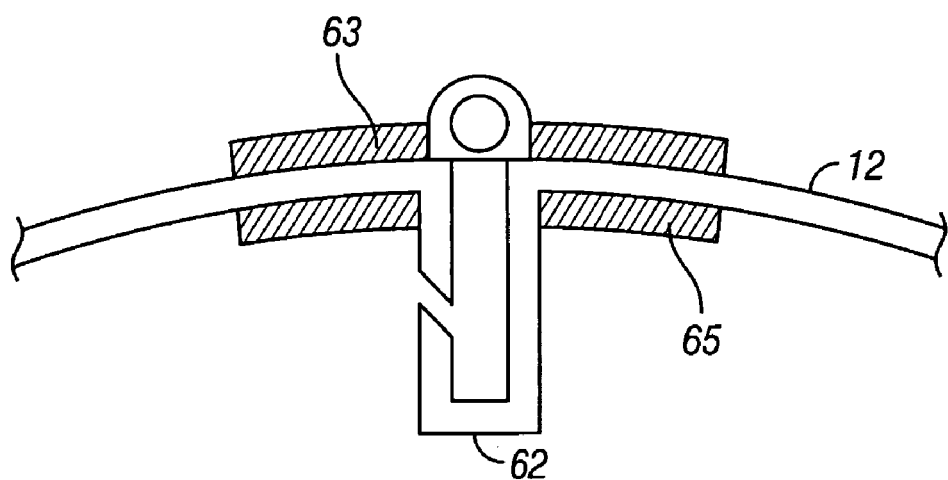
FIG. 15 shows an alternate embodiment of the J channel shown in FIG. 14, including an exterior hinge and alternate reinforcement.

FIG. 14 shows an end view of weatherproofing J channel 62 comprising a trough-shaped system for capturing any water, debris, dirt, and the like which has entered the cover assembly through seam 60 and hinge 14 before it reaches the contents of the vehicle bed. J channel 62 preferably runs the entire length of seam 60. Flange 80 of panel 12 is preferably extended to form J channel 62. The inside corners formed by the panel and the flange are preferably reinforced by braces 64. FIG. 15 shows an embodiment of J channel 62 with an alternate exterior hinge 63 and alternately shaped braces 65.

Figure 16:
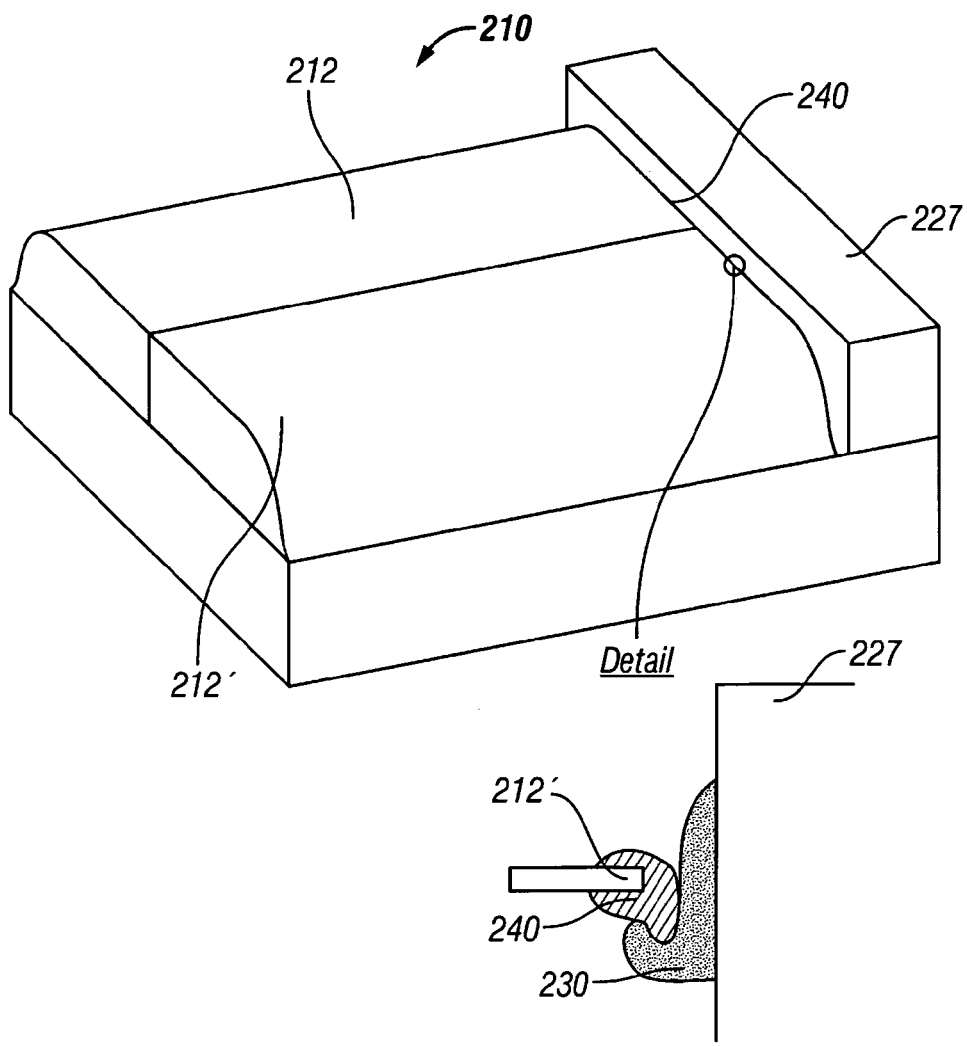
FIG. 16 shows a shortened embodiment of the vehicle bed cover assembly attached to a tool box.

FIG. 16 shows vehicle bed cover assembly 210 configured to accommodate toolbox 227 or like item permanently situated in the vehicle bed. Panels 212, 212' are preferably cut to the length necessary to cover the remainder of the vehicle bed; the end panel sections on the toolbox ends of the panels are not used. Seal 230 is preferably attached to toolbox 227 with epoxy or other fastening means known in the art. Edge seal 240 is preferably attached to the cut edge of panels 212 and 212'. When the panels are closed, edge seal 240 interlocks with, or otherwise rests on, seal 230 to provide a secure seal against weather while allowing for vehicle bed cover assembly 210 to be easily removed from or attached to the vehicle. The shape of seal 230 preferably matches the cross-sectional shape of curved panels 212, 212'. Alternatively, as shown in FIG. 17, a middle section of the panels may be removed so that the end panel sections are retained; in this case, seal 230 needs only to be attached straight across the toolbox in order to meet the straight bottom edge of the end panels. One or both of seal 230 and edge seal 240 preferably comprises a pliable material such as a vinyl or other plastic.

Figure 17A:
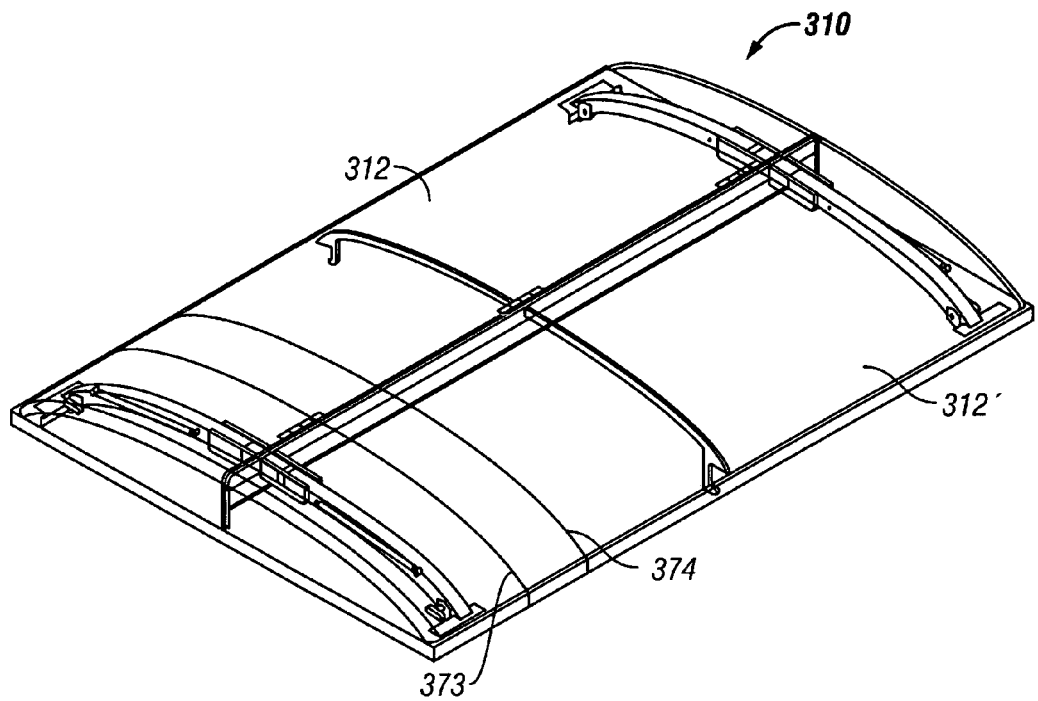
FIG. 17a shows an alternate embodiment of the vehicle bed cover assembly with adjustable length panels.
Figure 17B:
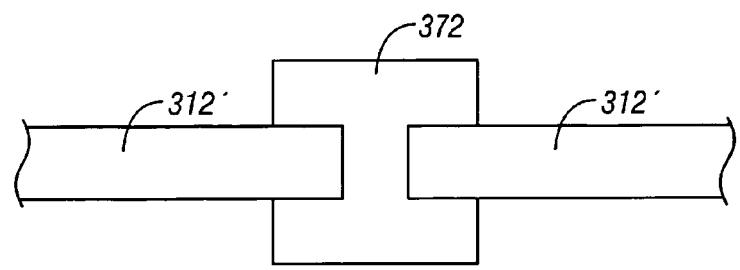
FIG. 17b is a cross-sectional detail of a fastener used to hold together two cut panel edges.

FIG. 17a shows alternate embodiment of vehicle bed cover assembly 310 comprising adjustable length panels 312 and 312'. Panels are cut at locations 373, 374, and the cut edges of the shortened panels are preferably inserted into and held together by fastener device 372 as shown in FIG. 17b. Fastener 372 preferably permanently joins the panel edges via glue or other adhesive or other joining means. Alternatively, fastener 372 is not used at all and the cut edges of the panels are directly glued together. This simple length adjustment allows a dealer to stock only a few sizes of the vehicle bed cover assembly of the present invention while still retaining the ability to custom fit the cover assembly to any vehicle bed.

Figure 18:
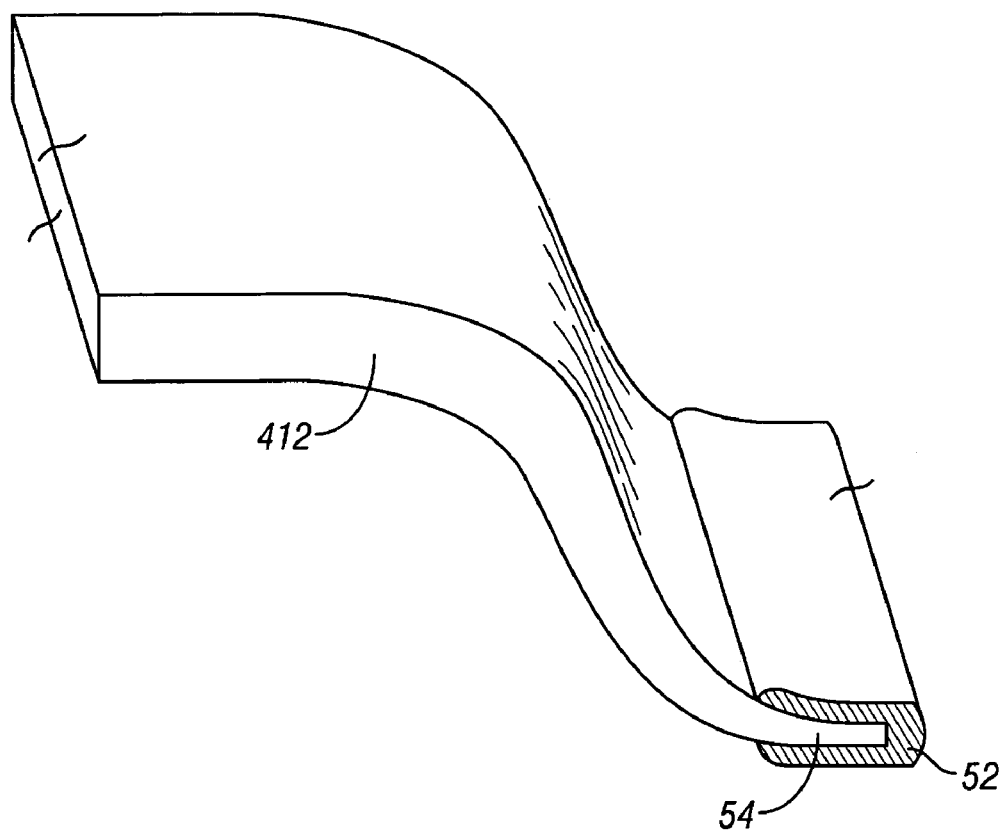
FIG. 18 is a cross-section of an curved panel with a tapered, trimmable edge to accommodate various vehicle widths.

FIG. 18 is a cross-sectional view of a preferred embodiment of the invention comprising curved panel 412. The panel comprises tapered edge 54 which is trimmable to accommodate various vehicle widths. Once trimmed, edge 54 is preferably inserted into and adhered to protective strip 52, which provides a smooth, finished edge. When panel 412 is closed, protective strip 52 may be disposed on top of, inside of, or under the lip of the vehicle rail. This simple width adjustment allows a dealer to stock only a few sizes of the vehicle bed cover assembly of the present invention while still retaining the ability to custom fit the cover assembly to any vehicle bed.

Figure 19:
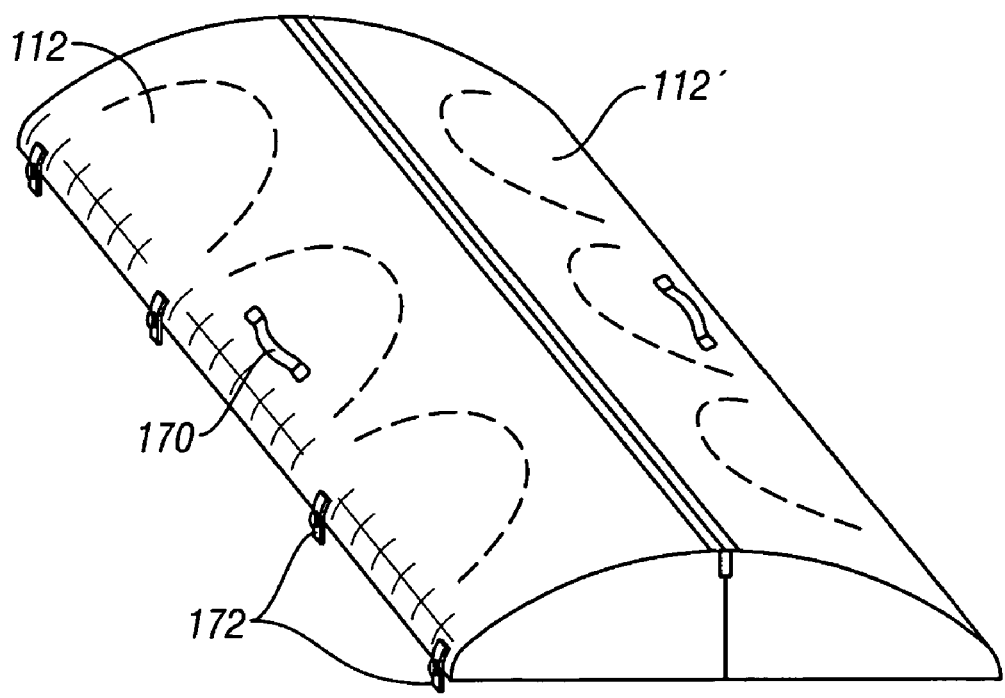
FIG. 19 shows an embodiment of the vehicle bed cover with concave indentations.

FIG. 19 shows an alternative embodiment of the present invention in which the surface of panels 112, 112' preferably comprises concave indentations for decreased wind resistance, decreased weight, or so that smaller items may be temporarily places on top of the panels without rolling off. Indentations of any shape or size may be used. One or more toolbox-type, optionally lockable latches 172 and fixed handle 170 are illustrated and may optionally be used instead of panel handle mechanism 140 discussed above.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A vehicle bed cover comprising:
   at least two support legs removably mounted on a vehicle, each support leg comprising non-horizontal top and bottom surfaces and spanning a vehicle bed; and at least two panels connected by one or more hinges, said panels removably supported by and conformable to said top surfaces of said support legs, said panels and support legs forming an elevated cover when said panels are closed on said support legs.

2. The vehicle bed cover of claim 1 wherein said support legs are arched.

3. The vehicle bed cover of claim 2 wherein said panels are curved.

4. The vehicle bed cover of claim 1 wherein a longitudinal center line of said cover is elevated by a greater amount than a vertical thickness of said support legs.

5. The vehicle bed cover of claim 1 wherein said panels comprise a rigid material.

6. The vehicle bed cover of claim 5 wherein said panels comprise polyethylene or fiberglass.

7. The vehicle bed cover of claim 1 wherein each panel weighs less than about 45 pounds.

8. The vehicle bed cover of claim 1 further comprising one or more supports rotatably attached between said panels and said support legs for supporting said panels in at least a partially open position.

9. The vehicle bed cover of claim 8 wherein said supports are extendable in length.

10. The vehicle bed cover of claim 1 further comprising one or more support rods rotatably attached to said vehicle.

11. The vehicle bed cover of claim 1 wherein said hinges permit separation of said panels.

12. The vehicle bed cover of claim 1 wherein said hinges permit each of said panels to open completely so as to rest on the other of said panels.

13. The vehicle bed cover of claim 1 wherein at least one of said panels comprises a channel for preventing water, debris, or dirt from reaching the vehicle bed.

14. The vehicle bed cover of claim 1 wherein said panels are able to be cut to a desired length.

15. The vehicle cover of claim 1 wherein said panels comprise trimmable edges.

16. The vehicle cover of claim 15 further comprising a protective strip enclosing said edges.

17. The vehicle cover of claim 1 wherein said panels comprise indentations.

18. The vehicle cover of claim 1 wherein each of said panels comprises at least one handle.

19. The vehicle cover of claim 18 wherein said handle locks a panel to said vehicle.

20. A vehicle bed cover comprising:
two or more curved panels, each panel comprising a horizontal side edge and two end panel sections each comprising a straight bottom edge and a curved top edge; and
one or more hinges connecting said panels, said hinges being oriented longitudinally with respect to a vehicle bed;
wherein when said panels are in a lowered position over the vehicle bed, said straight bottom edges of said end panel sections and horizontal side edges of said panels rest directly on a vehicle, said panels thereby forming an elevated cover.

* * * * *